US009236078B2

(12) United States Patent
Hu et al.

(10) Patent No.: US 9,236,078 B2
(45) Date of Patent: Jan. 12, 2016

(54) RECORDING MEDIUM FOR HEAT-ASSISTED-MAGNETIC-RECORDING (HAMR) AND METHOD FOR MANUFACTURING THE SAME

(71) Applicant: Agency for Science, Technology and Research, Singapore (SG)

(72) Inventors: Jiangfeng Hu, Singapore (SG); Jianzhong Shi, Singapore (SG); Wai Lwin Phyoe, Singapore (SG); Tiejun Zhou, Singapore (SG); Kiat Min Cher, Singapore (SG)

(73) Assignee: Agency for Science Technology and Research, Singapore (SG)

( * ) Notice: Subject to any disclaimer, the term of this patent is extended or adjusted under 35 U.S.C. 154(b) by 9 days.

(21) Appl. No.: 14/051,389

(22) Filed: Oct. 10, 2013

(65) Prior Publication Data
US 2014/0099517 A1     Apr. 10, 2014

(30) Foreign Application Priority Data
Oct. 10, 2012   (SG) ................ 201207570-1

(51) Int. Cl.
*G11B 5/66*   (2006.01)
*G11B 5/84*   (2006.01)
*G11B 5/738*  (2006.01)
*G11B 5/851*  (2006.01)

(52) U.S. Cl.
CPC .............. *G11B 5/8404* (2013.01); *G11B 5/738* (2013.01); *G11B 5/851* (2013.01)

(58) Field of Classification Search
CPC ....... G11B 5/8404; G11B 5/851; G11B 5/738
See application file for complete search history.

(56) References Cited

U.S. PATENT DOCUMENTS

| 8,576,672 | B1* | 11/2013 | Peng et al. | 369/13.14 |
| 2008/0026255 | A1* | 1/2008 | Das et al. | 428/831.2 |
| 2012/0251842 | A1* | 10/2012 | Yuan et al. | 428/800 |

OTHER PUBLICATIONS

Hu et al. "HAMR Medium Structure Design and Its Process for Excellent Thermal Performance," IEEE Trans Magn, vol. 50, No. 3, Mar. 2014, pp. 3201106-1 to 3201106-6.*

* cited by examiner

*Primary Examiner* — Holly Rickman
(74) *Attorney, Agent, or Firm* — Blakely, Sokoloff, Taylor & Zafman LLP

(57) ABSTRACT

According to embodiments of the present invention, a method for manufacturing a recording medium for heat-assisted-magnetic-recording (HAMR) is provided. The method includes forming an underlayer on a substrate, the underlayer including a precursor material, epitaxially depositing an interlayer on the underlayer, forming a recording layer over the interlayer, and converting the precursor material to a converted material having a thermal conductivity that is higher than a thermal conductivity of the recording layer. According to further embodiments of the present invention, another method for manufacturing a recording medium for heat-assisted-magnetic-recording (HAMR) and a recording medium for heat-assisted-magnetic-recording (HAMR) are also provided.

18 Claims, 13 Drawing Sheets

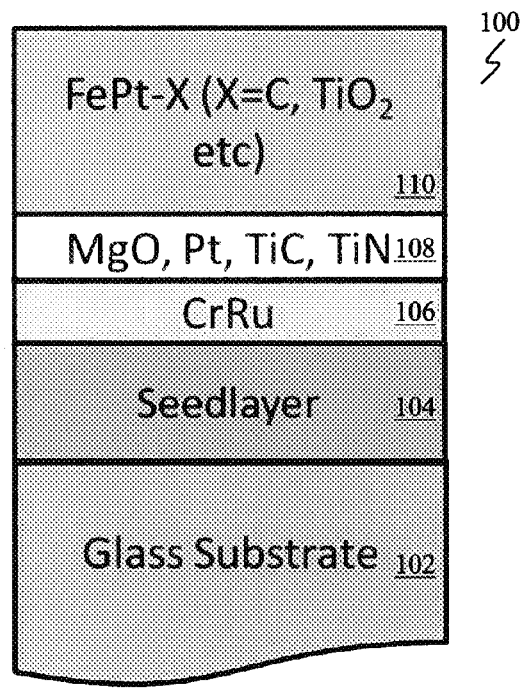
FIG. 1A (CONVENTIONAL)
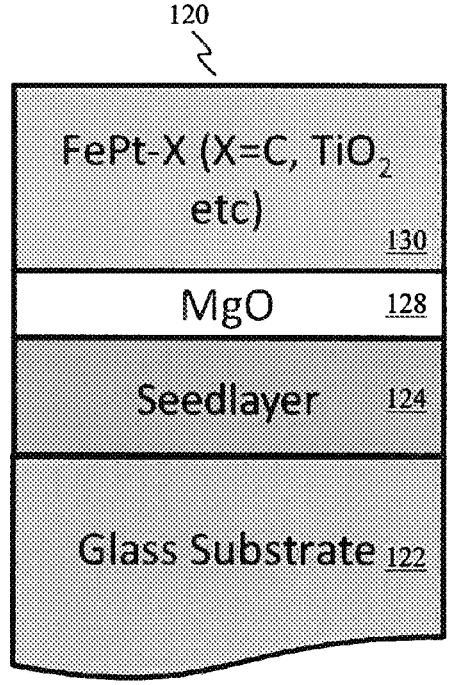
FIG. 1B (CONVENTIONAL)

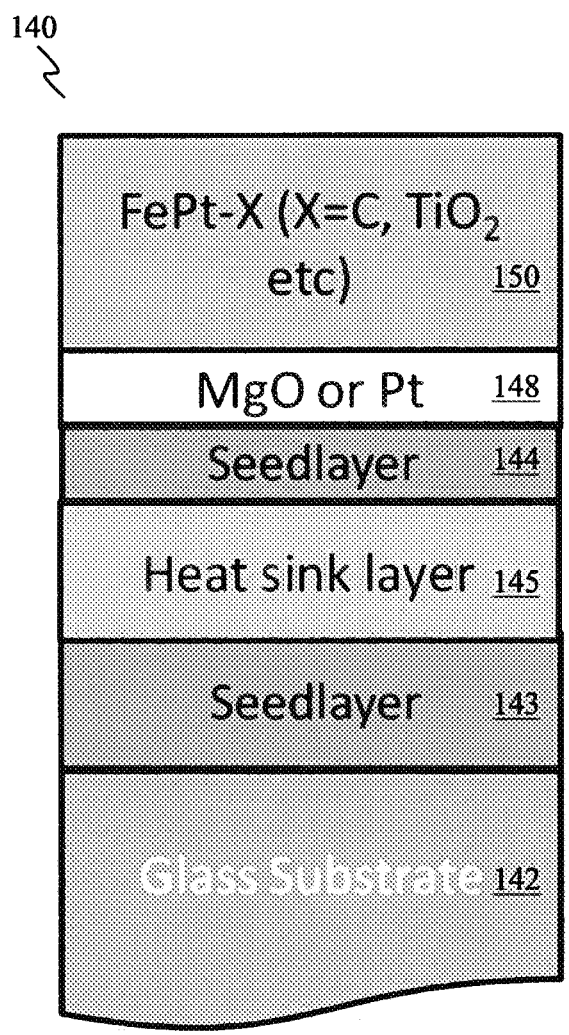
FIG. 1C (CONVENTIONAL)

RECORDING MEDIUM FOR HEAT-ASSISTED-MAGNETIC-RECORDING (HAMR) AND METHOD FOR MANUFACTURING THE SAME

CROSS-REFERENCE TO RELATED APPLICATION

This application claims the benefit of priority of Singapore patent application No. 201207570-1, filed 10 Oct. 2012, the content of it being hereby incorporated by reference in its entirety for all purposes.

TECHNICAL FIELD

Various embodiments relate to methods for manufacturing a recording medium for heat-assisted-magnetic-recording (HAMR) and a recording medium for heat-assisted-magnetic-recording (HAMR).

BACKGROUND

Iron-platinum (FePt) is a most promising candidate for heat-assisted-magnetic-recording (HAMR) applications. Examples of conventional iron-platinum (FePt) medium layer structures are shown in FIGS. 1A to 1C.

FIG. 1A shows a recording medium 100 including a glass substrate 102, a seedlayer 104, a chromium-ruthenium (CrRu) layer 106, a layer 108 of magnesium oxide (MgO), platinum (Pt), titanium carbide (TiC) or titanium nitride (TiN), and a recording layer 110. The seedlayer 104 helps to promote the deposition of a chromium-ruthenium (CrRu) layer 106. The CrRu layer 106 in turn acts as a seedlayer for the growth of the layer 108.

FIG. 1B shows a recording medium 120 including a glass substrate 122, a seedlayer 124, a magnesium oxide (MgO) layer 128, and a recording layer 130. The seedlayer 124 helps to promote the deposition of the magnesium oxide (MgO) layer 128.

FIG. 1C shows a recording medium 140 including a glass substrate 142, a seedlayer 143, a heat sink layer 145, another seedlayer 144, a layer 148 of magnesium oxide (MgO) or platinum (Pt), and a recording layer 150. The seedlayer 143 helps to promote the deposition of the heat sink layer 128 while the seedlayer 144 helps to promote the deposition of the layer 148.

Currently, there are lots of technical challenges that need to be overcome before FePt or FePtX (where X represents a third material, e.g. carbon (C), titanium oxide (TiO$_2$), or others) based composite films can be used for HAMR media applications. One of the challenges is to enable a fast cooling of the recording medium during the writing process. One approach may be to include a heat sink layer, but the introduction of the heat sink layer will cause some issues. These include (i) texture control where an epitaxial growth relationship is required between the heat sink layer and the MgO layer or an amorphous seedlayer is required for MgO growth, (ii) and surface roughness.

The fast cooling rate depends on the thickness and material of the heat sink layer in the medium, the physical distance between the recording layer and the heat sink layer, the layer structure of the HAMR medium, etc. There have been several proposals, such as to insert a heat sink layer into the HAMR medium layout by either using a crystallized heat sink layer material which has an epitaxial growth relationship with the magnesium oxide (MgO) intermediate layer in the medium, or insert an amorphous seedlayer between the heat sink layer and the MgO intermediate layer to enable the texture development of the MgO intermediate layer, thus enabling the texture control of the FePtX based HAMR medium.

A silver (Ag) based alloy could be one of the candidates for the heat sink layer owing to its epitaxial growth relationship with that of a (200) textured MgO. However, the growth of the Ag based alloy favors island growth, which results in an undesirably rough surface that will adversely affect flyability control of the recording medium. Furthermore, a Ag based heat sink layer will also imply a higher fabrication cost.

Copper (Cu)-based material has the advantages of better thermal conductivity, and a smoother surface. However, Cu does not have an epitaxial growth relationship with the MgO intermediate layer (e.g. the respective textures of Cu and MgO are not matched), and that means that an additional amorphous seedlayer needs to be deposited on top of the Cu based material or layer to enable the texture development of the MgO intermediate layer. The inserted additional layer will undesirably increase the physical distance between the Cu-based layer and the FePtX-based recording layer. Furthermore, the interfacial thermal conductance resulting from the additional layer, as the boundary thermal resistance dominates, could dramatically adversely affect the thermal spot size and the cooling rate of the media during the writing process, resulting in a larger thermal spot size and poor medium cooling efficiency. Therefore, a Cu or Cu based heat sink layer has not been perceived as desirable or even technically feasible.

SUMMARY

According to an embodiment, a method for manufacturing a recording medium for heat-assisted-magnetic-recording (HAMR) is provided. The method may include forming an underlayer on a substrate, the underlayer including a precursor material, epitaxially depositing an interlayer on the underlayer, forming a recording layer over the interlayer, and converting the precursor material to a converted material having a thermal conductivity that is higher than a thermal conductivity of the recording layer.

According to an embodiment, a method for manufacturing a recording medium for heat-assisted-magnetic-recording (HAMR) is provided. The method may include forming a heat sink layer including a copper-based material, forming an interlayer over the heat sink layer, and forming a recording layer over the interlayer.

According to an embodiment, a recording medium for heat-assisted-magnetic-recording (HAMR) is provided. The recording medium may include a recording layer, a heat sink layer including a copper-based material, and an interlayer arranged between the recording layer and the heat sink layer.

BRIEF DESCRIPTION OF THE DRAWINGS

In the drawings, like reference characters generally refer to like parts throughout the different views. The drawings are not necessarily to scale, emphasis instead generally being placed upon illustrating the principles of the invention. In the following description, various embodiments of the invention are described with reference to the following drawings, in which:

FIGS. 1A to 1C show respective conventional iron-platinum (FePt) medium layer structures.

DETAILED DESCRIPTION

Figure 2A:
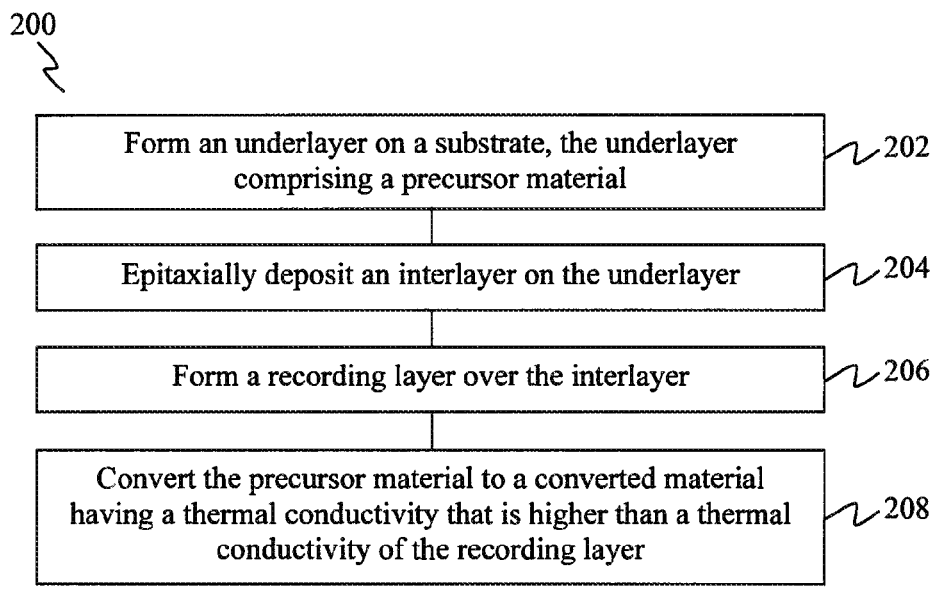
FIG. 2A shows a flow chart illustrating a method for manufacturing a recording medium for heat-assisted-magnetic-recording (HAMR), according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the methods or devices are analogously valid for the other method or device. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element includes a reference to one or more of the features or elements.

In the context of various embodiments, the phrase "at least substantially" may include "exactly" and a reasonable variance.

In the context of various embodiments, the term "about" or "approximately" as applied to a numeric value encompasses the exact value and a reasonable variance.

As used herein, the term "and/or" includes any and all combinations of one or more of the associated listed items.

As used herein, the phrase of the form of "at least one of A or B" may include A or B or both A and B. Correspondingly, the phrase of the form of "at least one of A or B or C", or including further listed items, may include any and all combinations of one or more of the associated listed items.

Various embodiments may relate to recording media and methods of manufacturing the same. For example, various embodiments may relate to iron-platinum (FePt) based media and methods of making thereof, where the media may be suitable for heat-assisted-magnetic-recording (HAMR) and other applications. In various embodiments, a layer structure for FePt or FePtX (X may include one or more of carbon (C), oxide(s) (e.g. titanium oxide ($TiO_2$)), carbide(s), nitride(s), etc. or any combination thereof) based HAMR media with improved thermal design may be provided. Various embodiments may provide an $L1_0$ ordered iron-platinum (FePt) based heat-assisted-magnetic-recording (HAMR) media with thermal design.

In heat-assisted-magnetic-recording (HAMR), the recording medium is temporarily and locally heated to effectively reduce the coercivity or magnetization switching field of the recording medium such that a magnetic write field applied from a writer may be able to write data or information to the recording medium during the writing process.

Various embodiments may provide FePt-based HAMR media, together with the process of making the media. The resulting media may allow more efficient cooling of the FePt-based HAMR media and a smaller thermal spot size during the writing process.

Various embodiments may provide a layer structure for FePtX-based HAMR media with improved thermal design. The HAMR medium structure may be simpler and the distance between the recording layer and the heat sink layer may be reduced to about 2.3 nm, which may be the thickness of the interlayer (e.g. magnesium oxide (MgO) intermediate layer). Various embodiments may provide a solution that satisfies both the requirements of texture control and thermal control for HAMR media applications.

In various embodiments, copper nitride (e.g. $Cu_3N$ or having other phases) may be used as an underlayer to induce the growth of a (200) textured MgO layer at room temperature (RT), which subsequently may enable the epitaxial growth of FePtX-based HAMR layer on top of the MgO interlayer. A high temperature process for FePtX-based HAMR layer deposition may then be carried out, during which the copper nitride material decomposes to copper (Cu), where the resultant copper layer may be suitable to act as the heat sink layer due to its high thermal conductance or conductivity. That is, the high temperature process converts the Cu nitride-based underlayer to a Cu-based heat sink layer, which may enable a more efficient cooling rate for the recording medium during the writing process. As a non-limiting example, various embodiments may enable the use of (001) textured $Cu_3N$ as an underlayer to induce MgO (200) texture deposition at room temperature. (001) textured FePtX composite films may then be grown on top of the (200) textured MgO at high temperatures. When the FePtX composite films are prepared at high temperatures, decomposition of copper nitride to Cu may occur, thereby providing a suitable Cu layer to act as the heat sink layer.

Various embodiments remove the need for an additional seedlayer between the heat sink layer and the MgO interlayer (intermediate layer), and advantageously eliminates the thermal boundary resistance resulting from the interface that otherwise form between the additional seedlayer and the MgO interlayer, which may be critical to get a smaller thermal spot size during the writing process. The simplification of the layer structure may effectively improve the medium cooling rate to avoid or at least minimise the thermal destabilization of the written bits during cooling down of the medium. Furthermore, the reduction of the distance between the FePtX recording layer and the Cu-based heat sink layer, as there is no additional seedlayer therebetween, may also allow a large thermal gradient to enable a higher areal density.

Various embodiments may further provide processes to fabricate the HAMR media with a Cu-based heat sink layer via decomposition of copper nitride in a high temperature process.

Various embodiments may include one or more of the following features: (1) a simplified layer structure; (2) copper nitride (e.g. $Cu_3N$ or having other phases) as the underlayer to induce MgO (200) texture without inserting a seedlayer therebetween. The absence of a seedlayer for MgO deposition reduces the physical distance between the recording layer and the heat sink layer, together with the elimination of the interfacial thermal conductance from such additional seedlayer, which thereby improves the media cooling rate to avoid thermal destabilization of the written bits during the media cooling down and enables a smaller thermal spot size for ultrahigh density recording; (3) the distance between the recording layer and the heat sink layer may be reduced to about 2.3 nm, which may be equivalent to the thickness of the MgO intermediate layer, (4) copper nitride (e.g. $Cu_3N$ or having other phases) as the underlayer to induce the growth of the (200) textured MgO layer, which enables the epitaxial growth of FePt-based HAMR layer on top of the MgO interlayer, (5) a high temperature process for FePt-based HAMR layer deposition, which may also decompose the copper nitride (e.g. $Cu_3N$ or having other phases) layer to a Cu layer which may be suitable to act as a heat sink layer due to the high thermal conductivity of Cu; (6) tunable MgO interlayer thickness and/or tunable copper nitride (e.g. $Cu_3N$ or having other phases) layer thickness to allow flexibility to optimize the thermal design; or (7) integration of the texture control and the cooling rate requirements.

FIG. 2A shows a flow chart 200 illustrating a method for manufacturing a recording medium for heat-assisted-magnetic-recording (HAMR), according to various embodiments.

At 202, an underlayer is formed on a substrate, the underlayer including a precursor material.

At 204, an interlayer is epitaxially deposited on the underlayer.

At 206, a recording layer is formed over the interlayer. This may include forming the recording layer on (e.g. directly on) the interlayer.

At 208, the precursor material is converted to a converted material having a thermal conductivity that is higher than a thermal conductivity of the recording layer.

In various embodiments, the interlayer is formed between the underlayer and the recording layer.

In the context of various embodiments, the interlayer and the underlayer may have an epitaxial growth (e.g. heteroepitaxial growth) relationship, meaning that a material of the interlayer has an epitaxial growth relationship with the precursor material of the underlayer.

In various embodiments, the step of converting the precursor material to a converted material may be carried out after epitaxially depositing the interlayer on the underlayer.

In various embodiments, the underlayer having the precursor material may be converted to form a heat sink layer having the converted material. In this context, the underlayer and the heat sink layer refer to the same layer but at different processing stages. The converted material may have a thermal conductivity that is higher than a thermal conductivity of the recording layer. This may mean that the heat sink layer with the converted material may have a thermal conductivity that is higher than the thermal conductivity of the recording layer. As a non-limiting example, the heat sink layer having the Cu-based material may have a thermal conductivity in a range of between about 10 W/mK and about 400 W/mK.

In various embodiments, at 206, the recording layer may be epitaxially deposited on the interlayer. The interlayer and the recording layer may have an epitaxial growth (e.g. heteroepitaxial growth) relationship, meaning that a material of the interlayer has an epitaxial growth relationship with a material of the recording layer.

In various embodiments, the step of forming a recording layer over the interlayer and the step of converting the precursor material to a converted material may be carried out at least substantially simultaneously. This may mean that these steps may be performed in a single process.

In various embodiments, at 202, the step of forming an underlayer may be carried out at room temperature. However, it should be appreciated that the step of forming or depositing the underlayer may also be carried out at an elevated temperature that is lower than the decomposition temperature of the material of the underlayer.

In various embodiments, at 204, the step of epitaxially depositing an interlayer on the underlayer may be carried out at room temperature.

In various embodiments, at 206, the step of forming a recording layer over the interlayer may be carried out at a temperature of between about 400° C. and about 750° C., for example between about 400° C. and about 700° C., between about 400° C. and about 600° C., between about 400° C. and about 500° C., or between about 500° C. and about 750° C. This may mean that the step of forming the recording layer may be performed in a high temperature process.

In various embodiments, at 208, the step of converting the precursor material to the converted material may be carried out at a temperature of between about 100° C. and about 750° C., for example between about 100° C. and about 600° C., between about 100° C. and about 470° C., between about 100° C. and about 300° C., between about 300° C. and about 750° C., or between about 470° C. and about 750° C. This may mean that the step of converting the precursor material to the converted material may be performed in a high temperature process.

In various embodiments, at 202, the underlayer may be sputter deposited on or over the substrate. This may mean that a sputtering process may be employed to deposit the underlayer on the substrate. The process of forming or depositing the underlayer on the substrate may be performed in an atmosphere having nitrogen (e.g. nitrogen gas). The atmosphere may further include argon (Ar). The method may further include controlling a processing condition of the deposition process, e.g. controlling a pressure of the atmosphere (e.g. total working pressure and/or the $N_2$ partial pressure).

In various embodiments, at 208, the precursor material may be decomposed to the converted material.

In various embodiments, the method may further include doping at least one of the underlayer or the interlayer. In the context of various embodiments, the dopants or doping elements for the underlayer may include but not limited to zirconium (Zr), palladium (Pd), tungsten (W), nickel (Ni), zinc (Zn), titanium (Ti), silver (Ag), chromium (Cr), beryllium (Be), aluminium (Al), or any combination thereof.

In the context of various embodiments, the dopants or doping elements for the interlayer may include but not limited to carbon (C), one or more oxides, one or more nitrides, one or more metallic elements, or any combination thereof. The oxide may include but not limited to tantalum oxide ($Ta_2O_5$), silicon oxide ($SiO_2$), magnesium oxide (MgO), aluminium oxide ($AlO_x$), alumina ($Al_2O_3$,) or boron oxide ($B_2O_3$). The nitride may include but not limited to boron nitride (BN), aluminium nitride (AlN), tantalum nitride (TaN), titanium nitride (TiN), or silicon nitride ($SiN_x$). The metallic element may include but not limited to silver (Ag), tungsten (W), titanium (Ti), or tantalum (Ta).

In various embodiments, the method may further include forming a seedlayer (e.g. nickel tantalum (NiTa)), wherein forming an underlayer includes forming the underlayer on the seedlayer.

In various embodiments, the precursor material may include a nitride-based material.

In various embodiments, the converted material may include a copper (Cu)-based material. Therefore, the precursor material may mean a material for forming the copper-based material.

In the context of various embodiments, the copper (Cu)-based material may include copper (for example copper, with minimal traces of other elements or non-intentional elements) or a copper alloy (CuX, where X may include one or more materials). In the context of various embodiments, the precursor material may include a copper nitride (e.g. $Cu_3N$ or copper nitride having other phases)-based material.

In various embodiments, interlayer may include at least one of magnesium oxide (MgO), platinum (Pt), titanium carbide (TiC) or titanium nitride (TiN).

In various embodiments, the interlayer may include at least one of a magnesium oxide (MgO)-based material, a titanium nitride (TiN)-based material, or a titanium carbide (TiC)-based material.

In various embodiments, the recording layer may include iron-platinum (FePt). The recording layer may include an iron-platinum alloy (FePtX, where X may include one or more of carbon (C), oxide(s) (e.g. titanium oxide ($TiO_2$)), carbide(s), nitride(s), etc. or any combination thereof)

In various embodiments, at 206, forming a recording layer may include forming an $L1_0$ phase magnetic layer. This may mean that the recording layer may include a material having an $L1_0$ phase crystal structure. As a non-limiting example, the recording layer may include $L1_0$ ordered FePt.

In various embodiments, the recording layer may include or may be made of composite thin films.

In the context of various embodiments, the precursor material for forming the copper-based material may have a (001) texture (e.g. $Cu_3N$ (001) texture).

In the context of various embodiments, the copper-based material may have a (200) texture (e.g. Cu (200) texture).

In the context of various embodiments, the interlayer may include a material having a (200) texture (e.g. MgO (200) texture).

In the context of various embodiments, the recording layer may include a material having a (001) texture (e.g. FePt (001) texture).

In the context of various embodiments, the method may be free of forming a seedlayer or an intermediate layer between the underlayer and the interlayer.

In the context of various embodiments, the recording medium may be a heat-assisted-magnetic-recording (HAMR) medium.

Figure 2B:
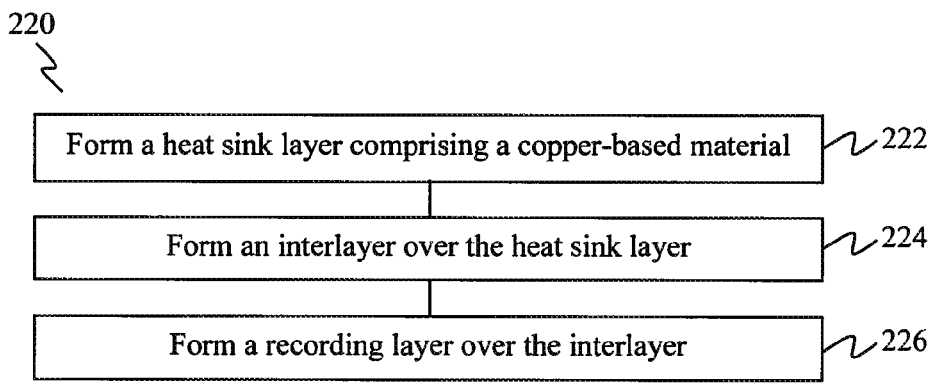
FIG. 2B shows a flow chart illustrating a method for manufacturing a recording medium for heat-assisted-magnetic-recording (HAMR), according to various embodiments.

FIG. 2B shows a flow chart 220 illustrating a method for manufacturing a recording medium for heat-assisted-magnetic-recording (HAMR), according to various embodiments.

At 222, a heat sink layer including a copper (Cu)-based material is formed.

At 224, an interlayer is formed over the heat sink layer. The interlayer may be arranged on the heat sink layer.

At 226, a recording layer is formed over the interlayer. This may include forming the recording layer on (e.g. directly on) the interlayer.

In various embodiments, the copper-based material may have a thermal conductivity that is higher than a thermal conductivity of the recording layer. This may mean that the heat sink layer with the copper-based material may have a thermal conductivity that is higher than the thermal conductivity of the recording layer.

In various embodiments, at 222, an underlayer including a precursor material for forming the copper-based material may be formed, and the precursor material may be converted to the copper-based material such that the underlayer forms the heat sink layer. In this context, the underlayer and the heat sink layer refer to the same layer but at different processing stages.

In various embodiments, the interlayer may be formed by epitaxially depositing the interlayer on the underlayer prior to converting the precursor material to the copper-based material.

In various embodiments, at 226, the recording layer may be epitaxially deposited on the interlayer.

While the respective methods described above are illustrated and described as a series of steps or events, it will be appreciated that any ordering of such steps or events are not to be interpreted in a limiting sense. For example, some steps may occur in different orders and/or concurrently with other steps or events apart from those illustrated and/or described herein. In addition, not all illustrated steps may be required to implement one or more aspects or embodiments described herein. Also, one or more of the steps depicted herein may be carried out in one or more separate acts and/or phases.

Figure 2C:
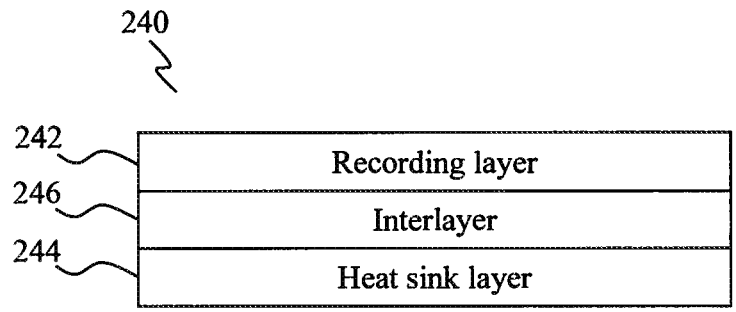
FIG. 2C shows a schematic diagram of a recording medium for heat-assisted-magnetic-recording (HAMR), according to various embodiments.

FIG. 2C shows a schematic diagram of a recording medium 240 for heat-assisted-magnetic-recording (HAMR), according to various embodiments. The recording medium 240 includes a recording layer 242, a heat sink layer 244 including a copper (Cu)-based material, and an interlayer 246 arranged between the recording layer 242 and the heat sink layer 244.

In other words, the recording medium 240 may have at least a three-layer structure having a recording layer 242 and a heat sink layer 244 arranged one over the other, with an interlayer 246 arranged in between. In this way, the recording medium 240 may have a layer structure of heat sink layer 244/interlayer 246/recording layer 242. The recording layer 242, the interlayer 246 and the heat sink layer 244 may be formed or deposited on a substrate (e.g. glass substrate) of the recording medium 240.

The heat sink layer 244 may include a Cu-based material (e.g. Cu or Cu alloy, and with or without dopants). The Cu-based material in the heat sink layer 244 may have a high thermal conductivity. For example, the thermal conductivity of the Cu-based material, and therefore also the thermal conductivity of the heat sink layer 244, may be higher than a thermal conductivity of the recording layer 242. In various embodiments, the Cu-based material may have a thermal conductivity in a range of between about 10 W/mK and about 400 W/mK, for example between about 10 W/mK and about 300 W/mK, between about 10 W/mK and about 100 W/mK, between about 50 W/mK and about 400 W/mK, between about 100 W/mK and about 400 W/mK, or between about 100 W/mK and about 250 W/mK.

In various embodiments, the interlayer 246 may be arranged on (e.g. directly on) the heat sink layer 244. The recording layer 242 may be formed or deposited on (e.g. directly on) the interlayer 246. The recording layer 242 may be epitaxially deposited on the interlayer 246.

In the context of various embodiments, the recording layer 242 may have a thickness in a range of between about 5 nm and about 20 nm, for example between about 5 nm and about 10 nm, between about 10 nm and about 20 nm, or between about 8 nm and about 15 nm.

In the context of various embodiments, the heat sink layer 244 may have a thickness in a range of between about 5 nm and about 200 nm, for example between about 5 nm and about 150 nm, between about 5 nm and about 100 nm, between about 5 nm and about 50 nm, between about 50 nm and about 200 nm, between about 50 nm and about 100 nm, or between about 100 nm and about 200 nm.

In the context of various embodiments, the interlayer 246 may have a thickness in a range of between about 1 nm and about 15 nm, for example between about 1 nm and about 10 nm, between about 1 nm and about 5 nm, between about 5 nm and about 15 nm, between about 5 nm and about 10 nm, or between about 10 nm and about 15 nm., e.g. about 2.3 nm, about 5 nm or about 7.2 nm.

In various embodiments, the distance between the recording layer 242 and the heat sink layer 244 may be defined by the thickness of the interlayer 246, for example the distance may be equal to the thickness of the interlayer 246.

In the context of various embodiments, the interlayer 246 may serve to provide magnetic property and microstructure control for the recording medium 240. For example, the interlayer 246 may control the deposition and characteristics of the recording layer 242.

In the context of various embodiments, at least one of the recording layer 242, the heat sink layer 244 or the interlayer 246 may have polycrystalline microstructures.

In various embodiments, the recording medium 240 may further include a seedlayer (e.g. nickel tantalum (NiTa) seedlayer) beneath the heat sink layer 244, for example between the substrate and the heat sink layer 244, wherein the seedlayer may promote the deposition of an underlayer having a precursor material for forming the copper-based material, where the underlayer may subsequently be formed into the heat sink layer 244 having the copper-based material.

In the context of various embodiments, the recording medium 240 may be a heat-assisted-magnetic-recording (HAMR) medium.

In the context of various embodiments, the recording medium 240 may be free of a seedlayer between the heat sink layer 244 and the interlayer 246.

In the context of various embodiments, the recording medium 240 may be free of an intermediate layer between the heat sink layer 244 and the interlayer 246.

In various embodiments, the Cu-based material may have a (200) texture. The precursor material employed for forming the copper-based material may have a (001) texture. The interlayer 246 may include a magnesium oxide (MgO)-based material having a (200) texture. The recording layer 242 may include a material having a (001) texture (e.g. iron-platinum (FePt) having a (001) texture). In various embodiments, the recording medium 240 may have a layer structure of Cu/MgO/FePt.

In the context of various embodiments, the term "epitaxial" may mean that an overlayer formed or deposited over an underlying layer may have at least one defined orientation (e.g. a controlled orientation) with respect to the crystal structure or crystallographic orientation of the underlying layer. In this way, an epitaxial overlayer formed on the underlying layer or an overlayer having an epitaxial growth relationship with an underlying layer may mean that there is a defined relationship between the respective crystal structures or orientations of the overlayer and the underlying layer, as opposed to a random orientation of the crystal structure of the overlayer relative to that of the underlying layer.

In the context of various embodiments, the term "underlayer" may mean a layer arranged beneath an interlayer, for example between the interlayer and a substrate.

In the context of various embodiments, the term "interlayer" may mean a layer arranged between an underlayer and a recording layer.

In the context of various embodiments, the term "recording layer" may include a storage layer. The recording layer may mean a layer where data or information may be stored or written to or read from.

In the context of various embodiments, the term "texture" with regard to a material may refer to a crystallographic orientation of the material.

In the context of various embodiments, the term "room temperature" may include a temperature range of between about 20° C. and about 30° C.

A reference to iron-platinum (or FePt) may include a reference to iron-platinum alloy (or FePtX, where X is a third material or element), and vice versa.

It should be appreciated that one or more steps of the method as described in the context of FIG. 2A may be equivalently provided in the method as described in the context of FIG. 2B, and vice versa.

It should be appreciated that any description relating to a recording medium (e.g. the layer structure, material(s), parameter(s), etc.) in the context of any one of the method described in relation to FIG. 2A, the method described in relation to FIG. 2B, or the recording medium in relation to FIG. 2C, may be applicable to each other.

As described above, various embodiments may utilize copper nitride (e.g. $Cu_3N$) as an underlayer to control the MgO texture of the interlayer (e.g. 246) at room temperature and provide decomposition of copper nitride at a high temperature to cause the copper nitride underlayer to become or form a Cu heat sink layer (e.g. 244), which does not affect the texture of the FePt-based HAMR recording layer (e.g. 242) grown on top of the MgO interlayer.

In various embodiments, the characteristics of the recording layer 242 may be dependent, at least in part, on one or more layers beneath the recording layer 242, e.g. the underlayer 246. The respective microstructures of the different layers beneath the recording layer 242 may be controlled to provide the desired characteristics of the recording layer 242.

Figure 3:
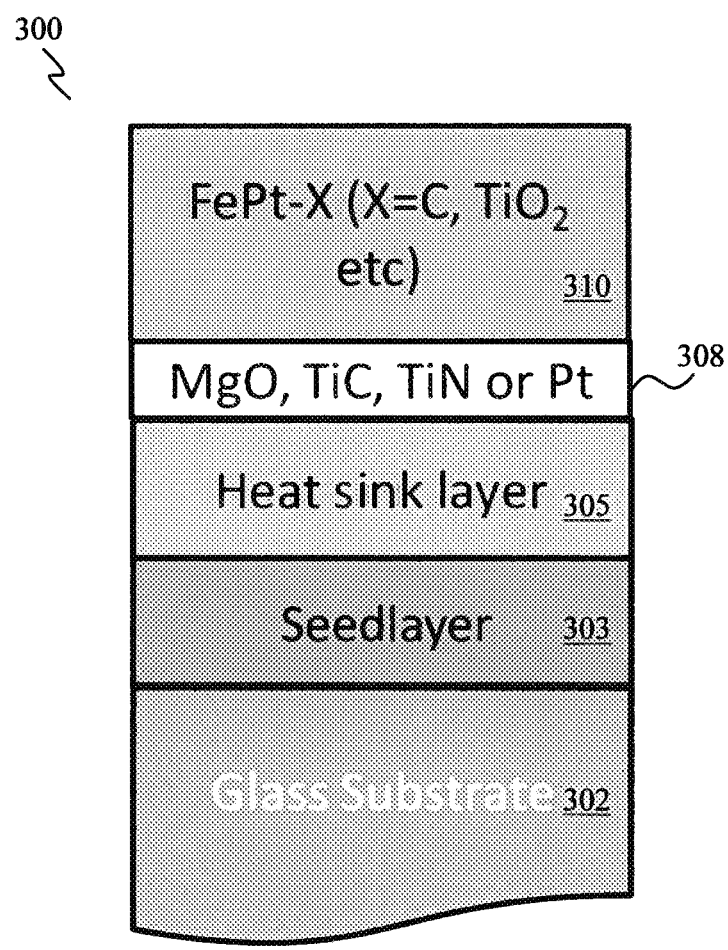
FIG. 3 shows a schematic diagram of a recording medium, according to various embodiments.

FIG. 3 shows a schematic diagram of a recording medium 300, according to various embodiments. The recording medium 300 may include a glass substrate 302, a seedlayer 303, a heat sink layer 305, an interlayer 308 and a recording layer 310. As shown in FIG. 3, the seedlayer 303 may be arranged over the glass substrate 302, the heat sink layer 305 may be arranged over the seedlayer 303, the interlayer 308 may be arranged over the heat sink layer 305 and the recording layer 310 may be arranged over the interlayer 308. The recording medium 300 may be a heat-assisted-magnetic-recording (HAMR) medium.

In various embodiments, the recording layer 310 may be arranged or formed directly on the interlayer 308, meaning that the interlayer 308 and the recording layer 310 may be in direct contact and defining an interface therebetween. In various embodiments, the interlayer 308 may be arranged or formed directly on the heat sink layer 305, meaning that the interlayer 308 and the heat sink layer 305 may be in direct contact and defining an interface therebetween.

In various embodiments, the interlayer 308 and the recording layer 310 may have an epitaxial growth relationship with each other. For example, the recording layer 310 may be epitaxially deposited or grown on the interlayer 308. This may mean that the interlayer 308 may induce growth of the recording layer 310 having a defined crystallographic or structural orientation with respect to the interlayer 308.

In various embodiments, the heat sink layer 305 may be formed from an underlayer having a material that is a precursor to the material of the heat sink layer 305. The material of the underlayer may be converted to the material of the heat sink layer 305. The conversion may occur in response to a stimulus, for example heat. During the fabrication process, the initial underlayer may be formed on the seedlayer 303, whose growth is promoted by the seedlayer 303. The interlayer 308 may then be formed over the underlayer. The interlayer 308 and the underlayer may have an epitaxial growth relationship with each other. For example, the interlayer 308 may be epitaxially deposited or grown on the underlayer. This may mean that the underlayer may induce growth of the interlayer 308 having a defined crystallographic or structural orientation with respect to the underlayer. In a subsequent process, the material of the underlayer may be converted (e.g. decomposed) to the material of the heat sink layer 305. In this way, the initial underlayer may effectively be converted into the heat sink layer 305. At the same time during this conversion process, the recording layer 310 may be formed on the interlayer 308.

In various embodiments, the heat sink layer 305 may include a copper (Cu)-based material.

In various embodiments, the interlayer 308 may include at least one of magnesium oxide (MgO), titanium carbide (TiC), titanium nitride (TiN) or platinum (Pt).

In various embodiments, the recording layer 310 may include iron-platinum (FePt). As non-limiting examples, the recording layer 310 may include an iron-platinum alloy (FePtX) where X may include at least one of carbon or titanium oxide ($TiO_2$).

As shown in FIG. 3, the recording medium 300 may be free of a seedlayer or any intermediate layer between the heat sink layer 305 and the interlayer 308. In this way, the recording medium 300 (e.g. a HAMR medium structure) may be simplified by not having an additional seedlayer between the heat sink layer 305 and the interlayer (e.g. MgO layer) 308, which otherwise is present in conventional recording media. The presence of such additional seedlayer affects the cooling efficiency and the thermal spot size, and furthermore, the thermal profile will not have a large thermal gradient, thus a sharp transition cannot be achieved.

In various embodiments, it may be desirable to have the interlayer (e.g. MgO layer) 308 as thin as possible, for example so as to reduce the distance between the heat sink layer 305 and the recording layer 310. Therefore, an intermediate layer may be provided to enable direct growth of the interlayer 308 on top of the intermediate layer, and at the same time, this intermediate layer may act as the heat sink layer. In various embodiments, the intermediate layer may be an underlayer to promote growth of the interlayer 308, where the intermediate layer may then be processed to function as the heat sink layer 305.

In various embodiments, (001) textured copper nitride (e.g. (001) textured $Cu_3N$) may be employed as the underlayer as it has a structure which may be used to induce the epitaxial growth of MgO. The copper nitride layer decomposes at high temperatures (e.g. higher than 470° C.) into a Cu layer, which may be suitable for heat sink layer applications.

Figures 4A, 4B:
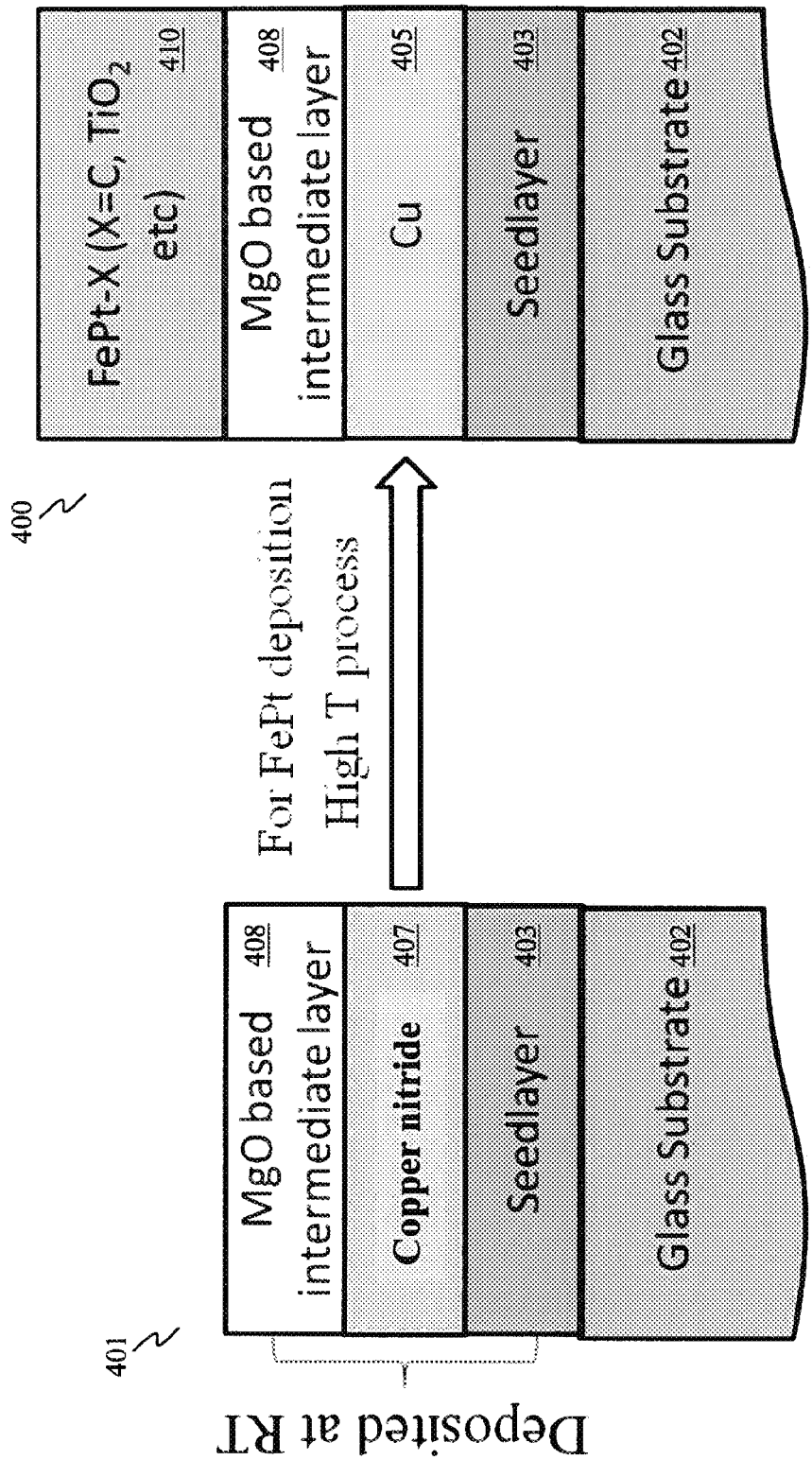
FIGS. 4A and 4B show, as schematic views, various processing stages of a method for manufacturing a recording medium, according to various embodiments.

FIGS. 4A and 4B show, as schematic views, various processing stages of a method for manufacturing a recording medium, according to various embodiments. FIGS. 4A and 4B show a medium fabrication process and the formation of a FePt-based HAMR recording medium with a designed heat sink layer, illustrating the layer structure and the materials of the FePt-based medium composite films with a heat sink layer. As non-limiting examples, the manufacturing method is described based on a MgO interlayer and a $Cu_3N$ underlayer.

Referring to FIG. 4A, a glass substrate (e.g. a glass disk substrate) 402 may be provided. A seedlayer (e.g. nickel tantalum (NiTa) seedlayer) 403 may be formed or deposited on the glass substrate 402 at room temperature (RT). A copper nitride underlayer (e.g. $Cu_3N$ layer, e.g. (001) textured $Cu_3N$ layer) 407 may then be deposited on the seedlayer 403 at room temperature. Subsequently, a MgO-based interlayer (e.g. (200) textured MgO) 408 may be deposited on top of the copper nitride underlayer 407 at room temperature. The copper nitride underlayer 407 may enable heteroepitaxial growth of MgO, thus forming the MgO interlayer 408. Respective interfaces may be defined between the copper nitride underlayer 407 and the seedlayer 403, and between the MgO-based interlayer 408 and the copper nitride underlayer 407. Therefore, the layer structure 401 may be obtained, for example a disk with NiTa/$Cu_3N$/MgO.

Subsequently, the layer structure 401 may be subjected to a high temperature process at about 470° C. or more. Referring to FIG. 4B, the high temperature process is carried out for deposition of a FePt-based recording layer 410. Therefore, the layer structure 401 may be heated up, followed by the deposition of the FePt-based granular films, e.g. having FePt (001) texture, for the recording layer 410. The recording layer 410 may be deposited on the MgO interlayer 408. The recording layer 410 may include FePtX, where X may include but not limited to carbon (C) or titanium oxide ($TiO_2$). The high temperature process for the FePt HAMR layer deposition also decomposes copper nitride into Cu, thereby converting the copper nitride underlayer 407 to a Cu layer 405. The Cu layer 405 may be suitable to serve as a heat sink layer due to its high thermal conductivity, which is at least higher than that of the recording layer 410. The conversion of copper nitride to Cu does not deteriorate the texture of MgO of the interlayer 408, and thus the preferred FePt (001) texture may be achieved. Therefore, a resulting recording medium 400 may be obtained. The Cu layer 405 may enable fast cooling rate of the recording medium 400, for example during the process of writing information to the recording layer 410 of the recording medium 400.

Figures 4C, 4D:
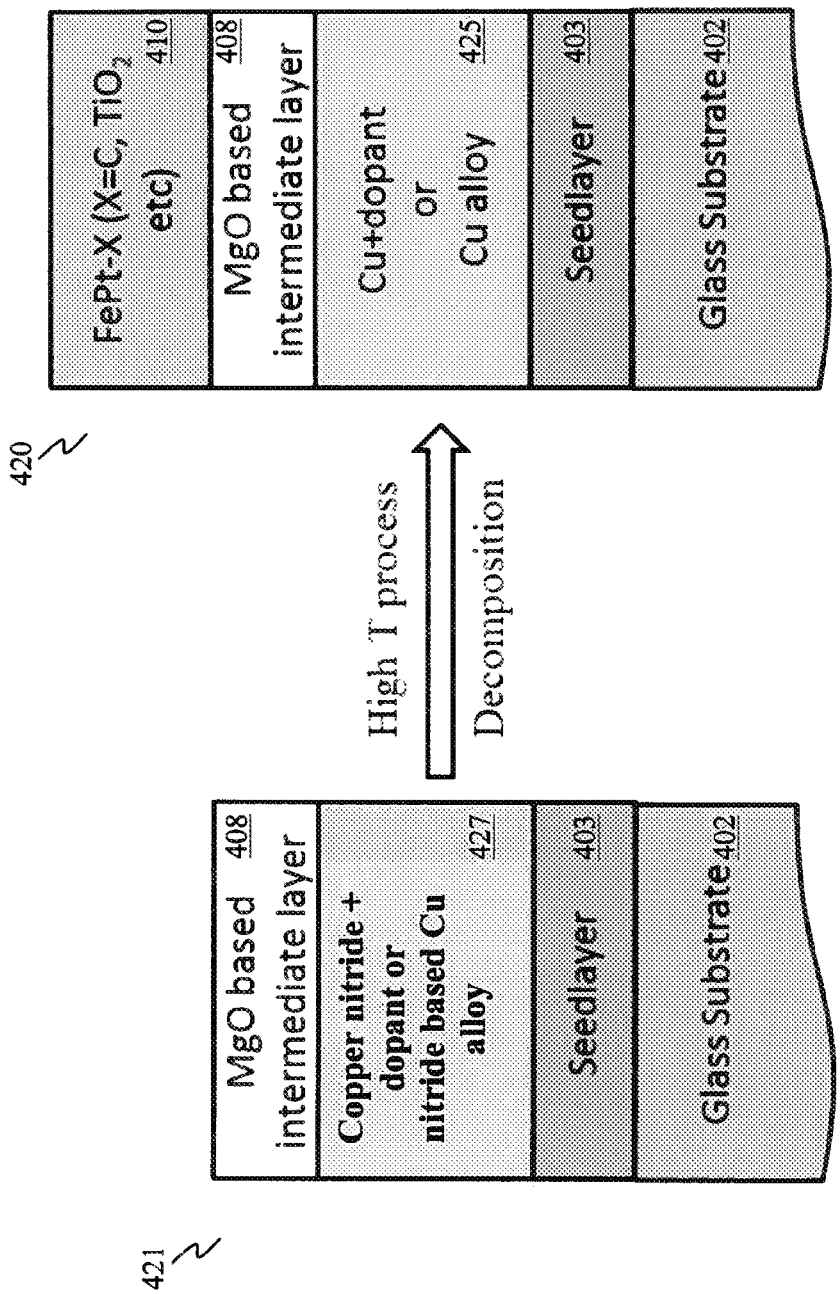
FIGS. 4C and 4D show, as schematic views, various processing stages of a method for manufacturing a recording medium, according to various embodiments.

FIGS. 4C and 4D show, as schematic views, various processing stages of a method for manufacturing a recording medium, according to various embodiments. FIGS. 4C and 4D illustrate formation of a FePt-based HAMR recording medium with a designed heat sink layer, illustrating the layer structure and the materials of the FePt-based medium composite films with a heat sink layer. The fabrication process and the recording medium layer structure as described in the context of FIGS. 4A and 4B may be applicable to the embodiments illustrated in FIGS. 4C and 4D, except that, in place of a pure Cu-based system, an underlayer 427 having copper nitride (e.g. $Cu_3N$) with one or more dopants, or an underlayer 427 having a nitride-based copper alloy (($CuX)N_x$, where X represents another material, e.g. $(CuX)_3N$) may be deposited on the seedlayer 403. Referring to FIG. 4C, the layer structure 421 may be obtained. During the subsequent high temperature process for deposition of the FePt-based recording layer 410, the underlayer 427 may be converted to a layer 425 having Cu with one or more dopants, or a Cu alloy, as shown in FIG. 4D. Therefore, a resulting recording medium 420 may be obtained. The layer 425 may be employed as a heat sink layer due to its high thermal conductivity, which is at least higher than that of the recording layer 410. For the recording medium 420, the dopant(s) or doping element(s) or the Cu-based alloy may improve at least one of the mechanical property or the anticorrosive property of the Cu based heat sink layer 425 to fit the requirements, for example, for disk drive applications.

In various embodiments, the MgO interlayer 408 of FIGS. 4A to 4D may be doped, for example with one or more other oxides and/or one or more other metallic elements.

In various embodiments, the underlayer 407 or 427 may be deposited using a sputtering process. Using the copper nitride underlayer 407 as a non-limiting example, the copper nitride underlayer 407 may be deposited in an atmosphere having argon (Ar) and nitrogen ($N_2$). The deposition process may be controlled by changing the total working pressure and/or the $N_2$ partial pressure during the sputtering process.

Figure 5A:
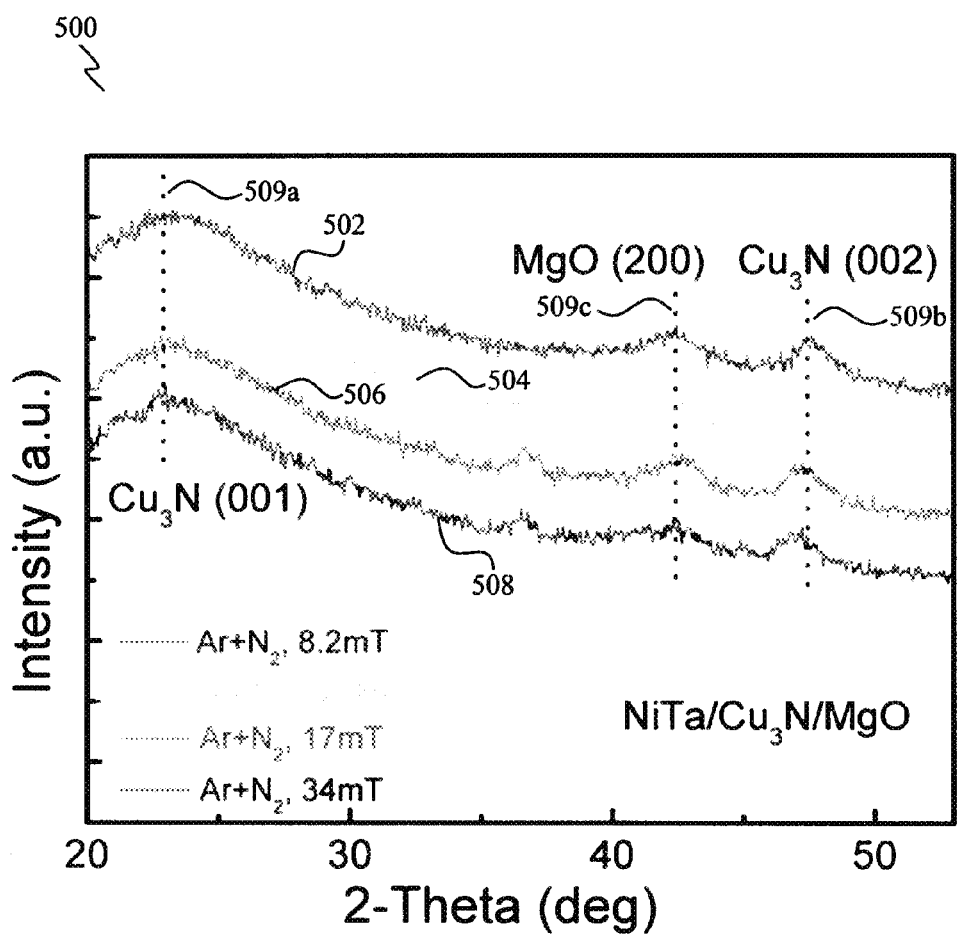
FIG. 5A shows a plot of X-ray diffraction (XRD) patterns of respective copper nitride underlayers deposited under different conditions, according to various embodiments.

FIG. 5A shows a plot 500 of X-ray diffraction (XRD) patterns of respective copper nitride (e.g. $Cu_3N$) underlayers deposited under different conditions, according to various embodiments, illustrating the texture development of copper nitride for a layer structure having NiTa/$Cu_3N$/MgO. The plot 500 shows the XRD pattern 502 for a copper nitride film deposited at a total working pressure of about 8.2 mT (milliTorr), the XRD pattern 504 for a copper nitride film deposited at a total working pressure of about 12.8 mT, the XRD pattern 506 for a copper nitride film deposited at a total working pressure of about 17 mT, and the XRD pattern 508 for a copper nitride film deposited at a total working pressure of 34 mT. FIG. 5A shows that (001) textured $Cu_3N$ thin films may be achieved via changing the total working pressure and the $N_2$ partial pressure during the sputtering process.

The respective XRD patterns 502, 504, 506, 508 show the presence of $Cu_3N$ (001) texture or crystallographic orientation as represented by the peaks indicated by the dashed line 509a, $Cu_3N$ (002) texture as represented by the peaks indicated by the dashed line 509b, and MgO (200) texture as represented by the peaks indicated by the dashed line 509c.

Figure 5B:
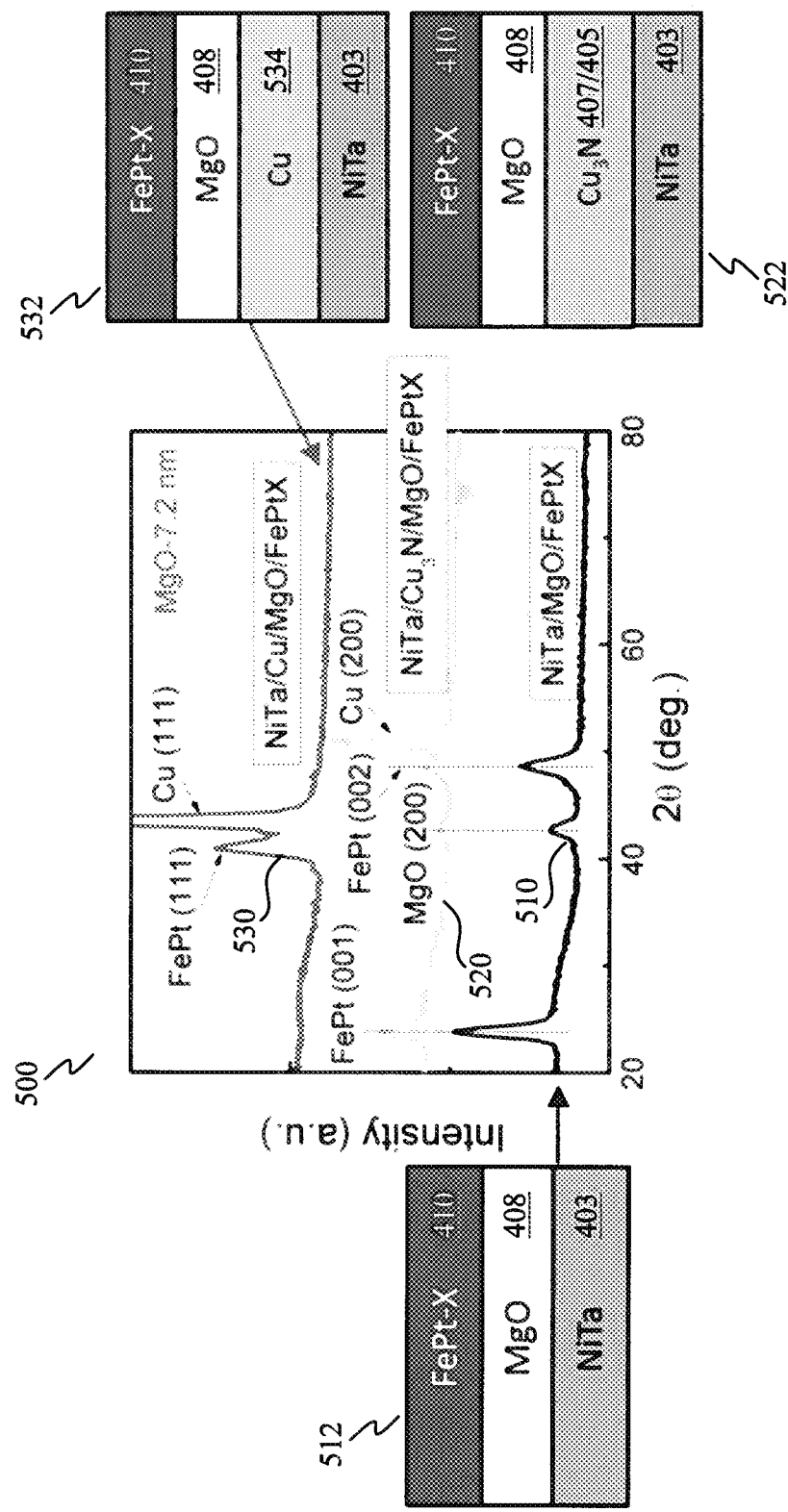
FIG. 5B shows a plot of X-ray diffraction (XRD) patterns of FePt-based composite films growth on different layer structures having a MgO interlayer with a thickness of about 7.2 nm, according to various embodiments.

FIG. 5B shows a plot 500 of X-ray diffraction (XRD) patterns of FePt-based composite films growth on different layer structures having a MgO interlayer with a thickness of about 7.2 nm, according to various embodiments. The layer structures are Glass/NiTa/MgO/FePtX, Glass/NiTa/Copper nitride (e.g. $Cu_3N$)/MgO/FePtX and Glass/NiTa/Cu/MgO/FePtX, where the thickness of each MgO layer is maintained at about 7.2 nm.

Plot 500 shows an XRD pattern 510 for a layer structure 512 having a NiTa seedlayer 403, a MgO interlayer 408 and a FePtX recording layer 410 (e.g. Glass/NiTa/MgO/FePtX). Plot 500 also shows an XRD pattern 520 for a layer structure 522 prepared according to the methods as described in the context of the embodiments of FIGS. 4A and 4B, where the layer structure 522 includes a NiTa seedlayer 403, a $Cu_3N$ underlayer 407 for the epitaxial deposition of a MgO interlayer 408, and subsequently converted in a high temperature process to a Cu heat sink layer 405, and a FePtX recording layer 410 (e.g. Glass/NiTa/$Cu_3N$/MgO/FePtX). Plot 500 also shows an XRD pattern 530 for a layer structure 532 having a NiTa seedlayer 403, a directly-formed Cu layer 534, a MgO interlayer 408 and a FePtX recording layer 410 (e.g. Glass/NiTa/Cu/MgO/FePtX).

In various embodiments, the preferred texture for Cu growth on an amorphous seedlayer (e.g. NiTa seedlayer 403) may be Cu (111), as shown by the XRD pattern 530. However, Cu having a (111) texture does not have an epitaxial growth relationship with the MgO interlayer 408, and thus both MgO (200) texture and FePt (001) texture may not be induced. As may be observed from the XRD pattern 530, a strong peak corresponding Cu (111) texture may be obtained, showing the presence of Cu (111) texture, which as a result, MgO (200) texture and FePt (001) texture may not develop. Nevertheless, a strong FePt (111) diffraction peak may be observed, indicating presence of FePt having a (111) texture. Therefore, for samples with MgO growth on Cu layer 534, a strong Cu (111) texture may be obtained, where MgO (200) texture and FePt (001) texture may not be developed.

Comparison of the XRD pattern 510 for a sample of FePt layer 410 grown directly on the MgO layer 408, which in turn is formed directly on the NiTa seedlayer 403, and the XRD pattern 520 for a sample where a copper nitride (e.g. $Cu_3N$) underlayer 407 is formed beneath the MgO layer 408 shows that the MgO (200) texture and FePt (001) texture may be well developed in both cases. The results show that inserting a copper nitride (e.g. $Cu_3N$) layer 407 between the NiTa seedlayer 403 and the MgO interlayer 408 does not adversely affect or destroy the texture of MgO.

For samples with a copper nitride (e.g. $Cu_3N$) layer 407, a strong Cu (200) diffraction peak may be observed, which means that the (001) textured $Cu_3N$ layer 407 may be converted to a (200) textured Cu layer 405 after the high temperature process employed for the deposition of FePtX 410. Such a conversion is due to the decomposition of copper nitride (e.g. $Cu_3N$) to Cu and $N_2$. Cu has a good thermal conductivity and the Cu layer 405 may be used as a heat sink layer for FePt based HAMR media.

Figure 5C:
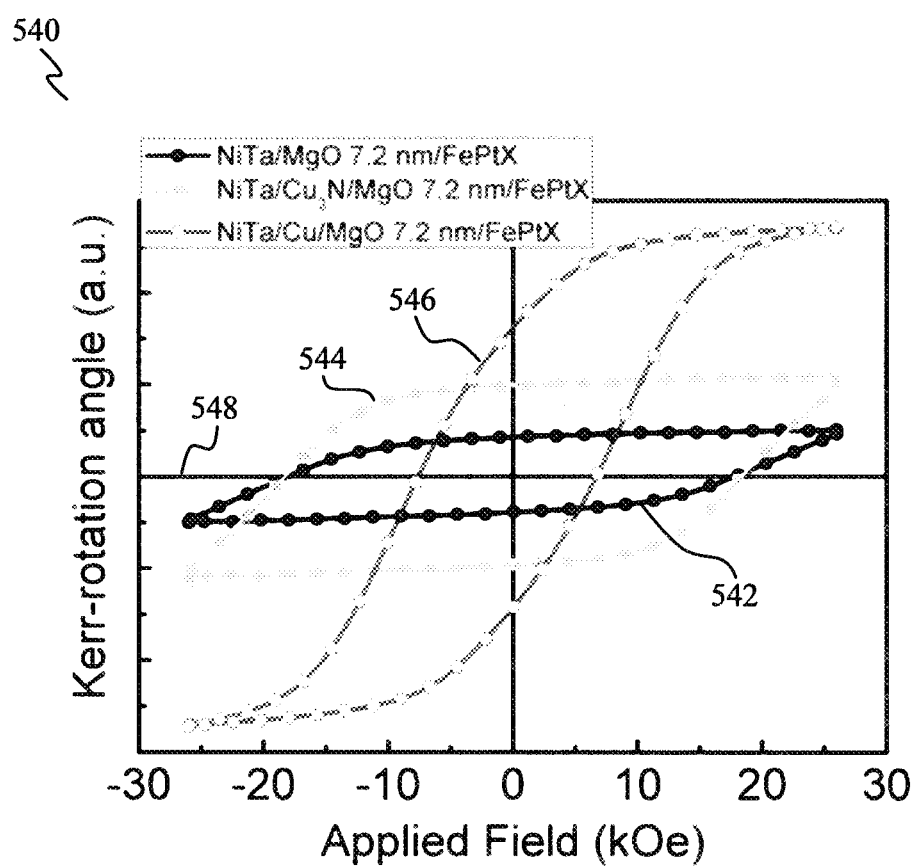
FIG. 5C shows a plot of hysteresis loops of FePt based composite films on different layer structures having a MgO interlayer with a thickness of about 7.2 nm, according to various embodiments.

FIG. 5C shows a plot 540 of hysteresis loops (magnetization-field (MH) loops) of FePt based composite films on different layer structures having a MgO interlayer with a thickness of about 7.2 nm, according to various embodiments. Plot 540 shows a hysteresis loop 542 for a sample having the layer structure 512 shown in FIG. 5B, a hysteresis loop 544 for a sample having the layer structure 522 shown in FIG. 5B, and a hysteresis loop 546 for a sample having the layer structure 532 shown in FIG. 5B.

For a layer structure 532 (FIG. 5B) having a FePtX film 410 with a pure Cu layer 534, which is a directly grown Cu layer, inserted between the NiTa seedlayer 403 and the MgO interlayer 408, both the coercivity (Hc), which is the value of the applied field corresponding to the intersection of the loop 546 with the line 548, and the loop squareness (S) are much smaller compared to the other two layer structures with and without an inserted copper nitride (e.g. Cu$_3$N) layer 407, which means that FePt (001) texture may not be well developed for samples having the layer structure 532 having a pure, directly grown Cu layer 534 beneath the MgO layer 408.

For samples having the layer structures 512, 522, the respective hysteresis loops 542, 544 show a large Hc, together with good loop squareness (S). For samples having the inserted copper nitride (e.g. Cu$_3$N) layer 407, Hc is slightly larger than samples having FePtX 410 grown on NiTa 403/MgO 408, which means that the magnetic properties of the FePtX thin film 410 do not deteriorate with the introduction of the copper nitride (e.g. Cu$_3$N) layer 407, which is subsequently converted to form the Cu heat sink layer 405.

Results from the XRD and magnetic properties measurement show that the FePt (001) texture may be well developed in samples having an inserted copper nitride (e.g. Cu$_3$N) layer 407 beneath the MgO layer 408, and the magnetic properties may remain the same or even better as compared to samples having the layer structure 512. This means that the decomposition of copper nitride (e.g. Cu$_3$N) to Cu and N$_2$ may not affect the texture of MgO and FePt too much in the high temperature process.

Figure 5D:
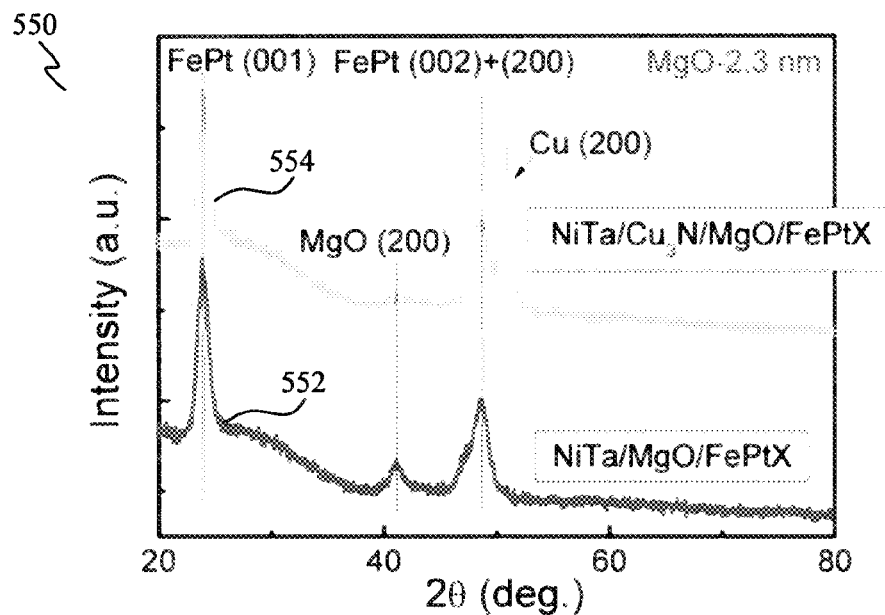
FIG. 5D shows a plot of X-ray diffraction (XRD) patterns of FePt-based composite films growth on a MgO interlayer with a thickness of about 2.3 nm, with and without a copper nitride underlayer beneath the MgO interlayer, according to various embodiments.

From thermal control point of view, the thickness of both the interlayer (MgO) 408 and the heat sink layer (Cu layer 405 from Cu$_3$N decomposition) may be tuned. FIG. 5D shows a plot 550 of X-ray diffraction (XRD) patterns of FePt-based composite films grown on a MgO interlayer with a thickness of about 2.3 nm, with and without a copper nitride (e.g. Cu$_3$N) underlayer beneath the MgO interlayer, according to various embodiments. Plot 550 shows an XRD pattern 552 for a layer structure similar to the layer structure 512 (e.g. Glass/NiTa/MgO/FePtX), but with a MgO layer thickness of about 2.3 nm. Plot 550 also shows an XRD pattern 554 for a layer structure similar to the layer structure 522 (e.g. Glass/NiTa/Cu$_3$N/MgO/FePtX), but with a MgO layer thickness of about 2.3 nm.

Figure 5E:
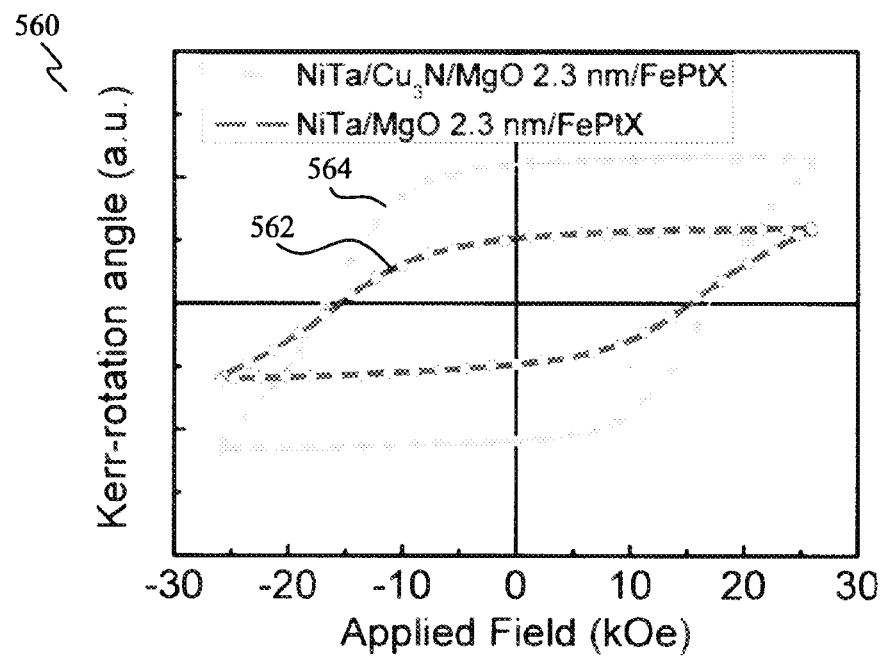
FIG. 5E shows a plot of hysteresis loops of FePt based composite films on different layer structures having a MgO interlayer with a thickness of about 2.3 nm, with and without a copper nitride underlayer beneath the MgO interlayer, according to various embodiments.

FIG. 5E shows a plot 560 of hysteresis loops of FePt based composite films on different layer structures having a MgO interlayer with a thickness of about 2.3 nm, with and without a copper nitride (e.g. Cu$_3$N) underlayer beneath the MgO interlayer, according to various embodiments. Plot 560 shows a hysteresis loop 562 for a sample having a layer structure similar to the layer structure 512, but with a MgO layer thickness of about 2.3 nm, and a hysteresis loop 564 for a sample having a layer structure similar to the layer structure 522, but with a MgO layer thickness of about 2.3 nm.

FIGS. 5D and 5E show that the results obtained for samples having a MgO interlayer 408 with a thickness of about 2.3 nm are at least substantially similar to those obtained for the thicker MgO layer 408 of about 7.2 nm. The results show that the FePt (001) texture may be obtained for an ultrathin MgO layer 408 with a thickness of about 2.3 nm and the magnetic properties may still be maintained. In various embodiments, tunability of the MgO layer thickness may allow optimization of the thermal control of the FePt based HAMR medium during the writing process.

Figure 6A:
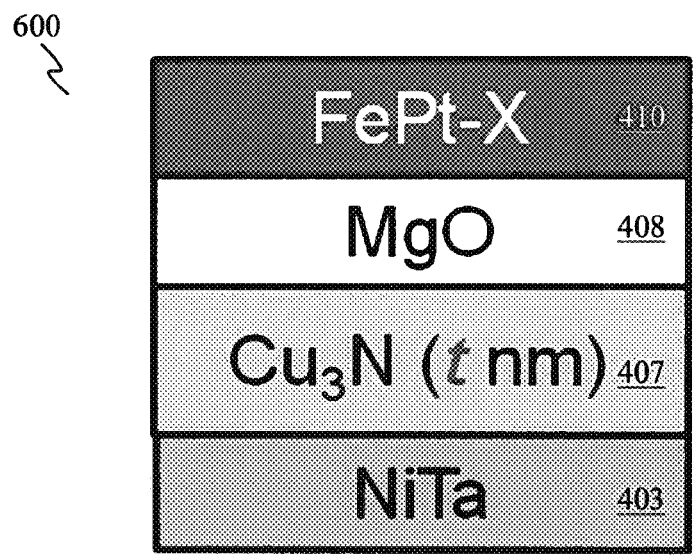
FIG. 6A shows a schematic diagram of a layer structure for a recording medium, according to various embodiments.

FIG. 6A shows a schematic diagram of a layer structure 600 for a recording medium, according to various embodiments, illustrating the possibilities for providing a copper nitride (e.g. Cu$_3$N) underlayer 407 of different thicknesses. The layer structure 600 includes a NiTa seedlayer 403, the copper nitride (e.g. Cu$_3$N) underlayer 407 having a thickness, t, a MgO interlayer 408 and a FePtX recording layer 410. The layer structure 600 may include a glass substrate (not shown) beneath the seedlayer 403. While FIG. 6A is illustrated in terms of the copper nitride (e.g. Cu$_3$N) underlayer, it should be appreciated that changes in the thickness of the copper nitride (e.g. Cu$_3$N) underlayer may result in corresponding changes in the thickness of the Cu heat sink layer that is formed after decomposition of copper nitride (e.g. Cu$_3$N) into Cu.

Figure 6B:
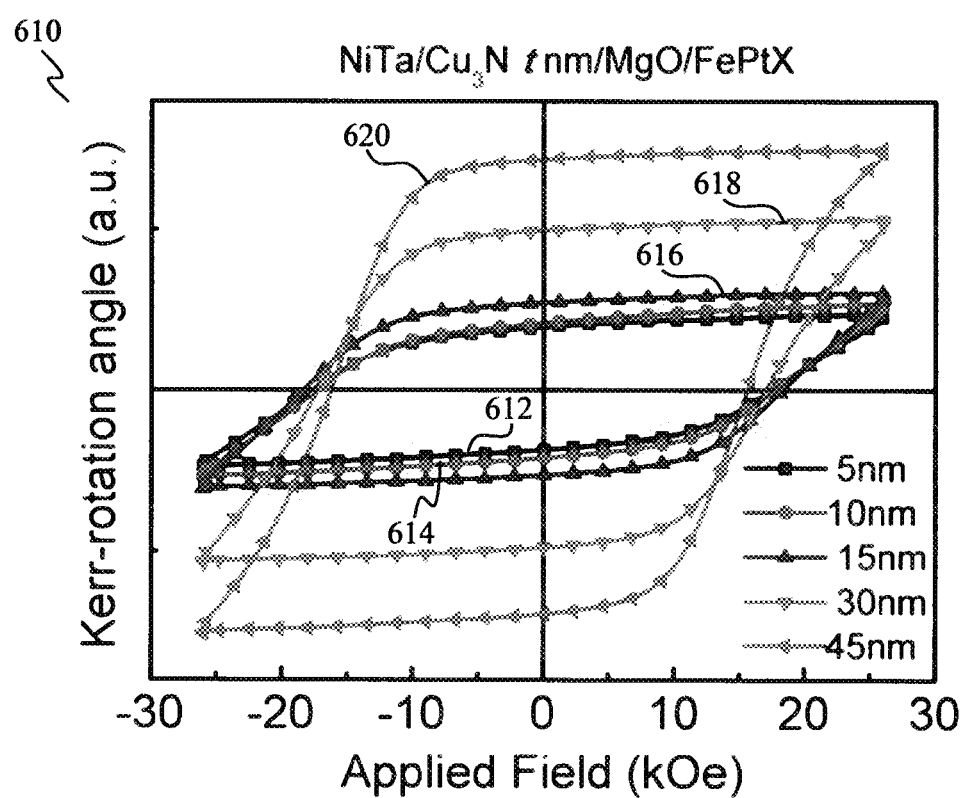
FIG. 6B shows a plot of hysteresis loops of FePt based composite films based on the layer structure of the embodiment of FIG. 6A for different thicknesses of the copper nitride layer.

FIG. 6B shows a plot 610 of hysteresis loops of FePt based composite films based on the layer structure of the embodiment of FIG. 6A for different thicknesses of the copper nitride (e.g. Cu$_3$N) layer 407, varied from about 5 nm to about 45 nm. The plot 610 shows a hysteresis loop 612 for a sample having a copper nitride (e.g. Cu$_3$N) layer 407 of about 5 nm, a hysteresis loop 614 for a sample having a copper nitride (e.g. Cu$_3$N) layer 407 of about 10 nm, a hysteresis loop 616 for a sample having a copper nitride (e.g. Cu$_3$N) layer 407 of about 15 nm, a hysteresis loop 618 for a sample having a copper nitride (e.g. Cu$_3$N) layer 407 of about 30 nm, and a hysteresis loop 620 for a sample having a copper nitride (e.g. Cu$_3$N) layer 407 of about 45 nm. It may be observed that the coercivity, Hc, is comparable for all the samples, which means that the magnetic properties of the FePtX thin films may not deteriorate or be adversely affected by the copper nitride layer thickness.

The results shown in FIGS. 5B, 5C, 5D, 5E and 6B show that the thickness of MgO layer 408 and/or the thickness of the copper nitride layer 407 may be tunable or changed without sacrificing the magnetic properties of the FePtX thin films 410, which may allow optimization of the thermal control of the FePt based HAMR media during the writing process.

Figure 7A:
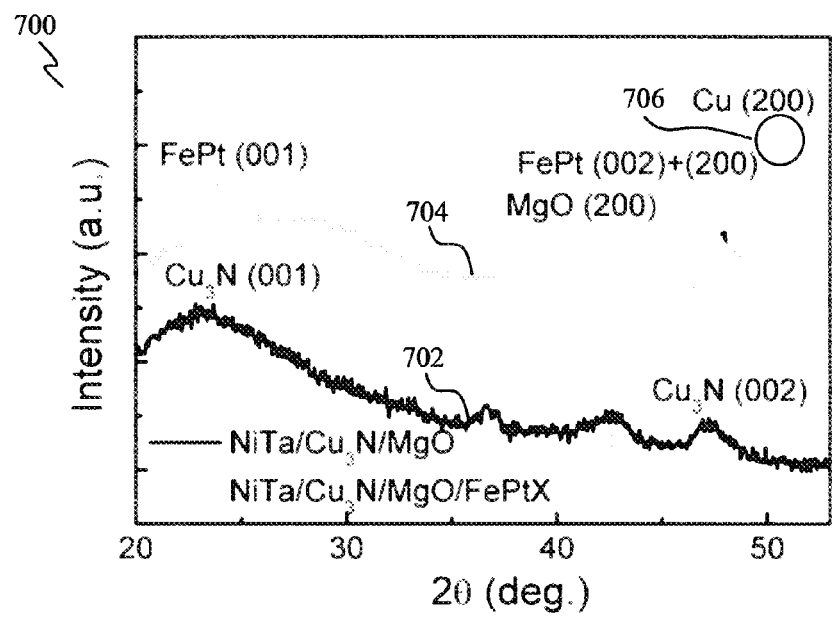
FIG. 7A shows a plot of X-ray diffraction (XRD) patterns of a layer structure before and after decomposition of copper nitride to Cu, according to various embodiments.

FIG. 7A shows a plot 700 of X-ray diffraction (XRD) patterns of a layer structure before and after decomposition of copper nitride (e.g. Cu$_3$N) to Cu, according to various embodiments, illustrating the transition of copper nitride (e.g. Cu$_3$N) to Cu at high temperature during deposition of FePt recording layer.

Plot 700 shows an XRD pattern 702 before decomposition of copper nitride (e.g. Cu$_3$N) and an XRD pattern 704 after decomposition of copper nitride (e.g. Cu$_3$N) into Cu. As may be observed, the (001) textured Cu$_3$N thin film has decomposed, after the high temperature process for FePtX (X may include MgO and/or C) thin film deposition, to become a (200) textured Cu thin film, as indicated by the peak corresponding to the Cu (200) texture shown within the circle 706.

Figure 7B:
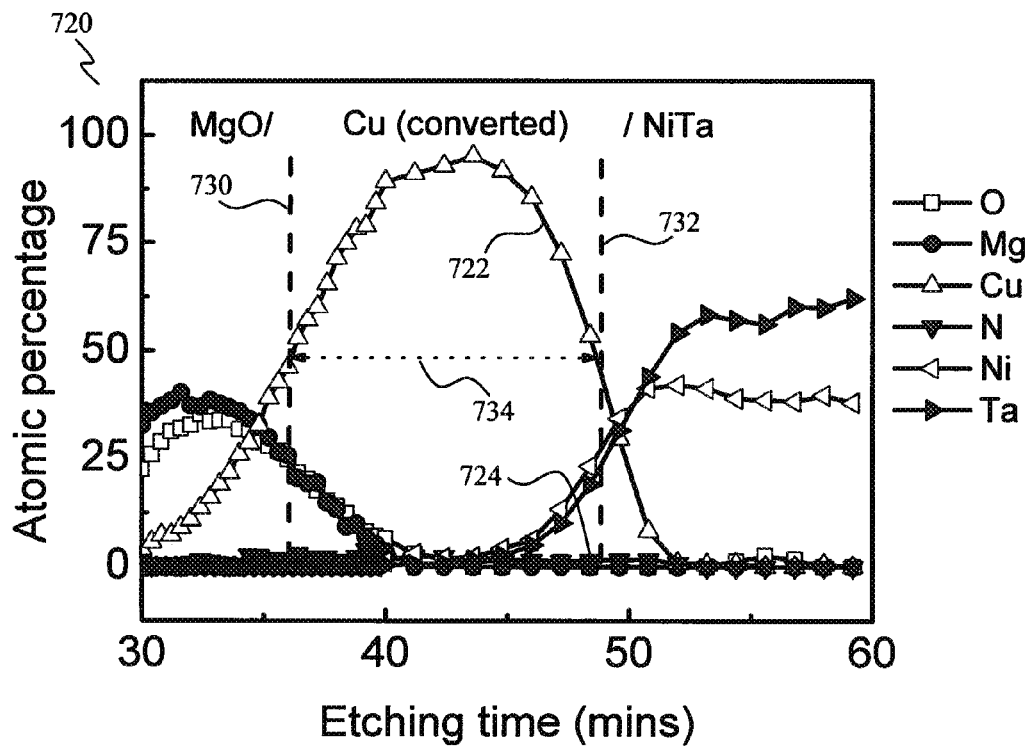
FIG. 7B shows a plot of X-ray photoelectron spectroscopy (XPS) depth profile of a copper nitride layer after a high temperature process, according to various embodiments.

FIG. 7B shows a plot 720 of X-ray photoelectron spectroscopy (XPS) depth profile of a copper nitride (e.g. Cu$_3$N) layer after a high temperature process, according to various embodiments. The plot 720 shows result 722 for Cu (which may correspond to Cu2p) and result 724 for N (which may correspond to N1s). The dashed line 730 represents the interface between the MgO interlayer and the Cu heat sink layer, while the dashed line 732 represents the interface between the Cu heat sink layer and the NiTa seedlayer. As may be observed, the amount of the N element is less than approximately 3 at. % (atomic percentage) inside the Cu heat sink film as represented by the dashed double-headed arrow 734, as compared to a Cu$_3$N underlayer before decomposition, which means that the copper nitride underlayer has completely or at least substantially converted to a Cu layer after the high temperature process.

The XPS results also show that the respective interfaces of Cu/MgO and NiTa/Cu is quite sharp and no residual N element was found at the interfaces as well. This means that no N element diffuses to the respective interfaces and/or the other layer(s).

Figure 8:
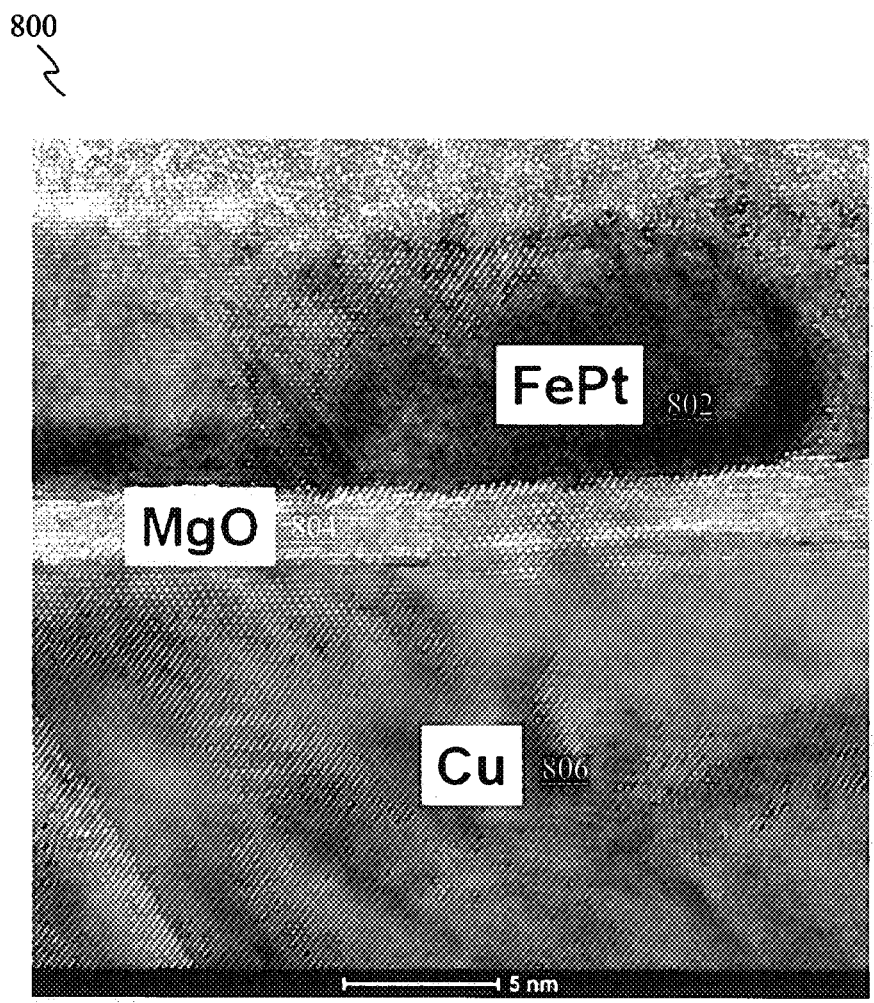
FIG. 8 shows a cross-sectional transmission electron microscopy (TEM) image of FePt based composite films grown on a 2.3 nm MgO layer with a (200) textured Cu layer beneath, after a high temperature process.

FIG. 8 shows a cross-sectional transmission electron microscopy (TEM) image 800 of FePt based composite films 802 grown on a 2.3 nm MgO layer 804 with a (200) textured Cu layer 806 beneath, after a high temperature process, illustrating a full stack HAMR medium. The high resolution TEM image 800 clearly shows the lattice fringes of the Cu heat sink layer 806, the MgO interlayer 804 and the FePt grains of the layer 802, which indicates that the crystalline Cu layer 806 may be formed and the decomposition of $Cu_3N$ to Cu does not deteriorate the texture of MgO, thus enabling an epitaxial growth relationship between the MgO interlayer 804 and the FePt based composite thin films 802. The FePt layer 802, the MgO layer 804 and the Cu layer 806 have polycrystalline microstructures. The FePt layer 802 may have <002> and <200> growth directions for FePt. There may be lattice matched growth of Cu 806, MgO 804 and FePt 802 layers with tensile strain in the Cu 806 and FePt 802 layers.

As described above, various embodiments successfully utilize copper nitride (e.g. $Cu_3N$) as an underlayer to control the magnesium oxide (MgO) texture at room temperature and the decomposition of copper nitride at a high temperature to convert the copper nitride underlayer to become a copper (Cu) heat sink layer, which does not affect the texture of the iron-platinum (FePt)-based HAMR medium/layer grown on top of the MgO interlayer. In various embodiments, the mechanical properties of the Cu-based heat sink layer may also be tuned via element doping with at least one of zirconium (Zr), palladium (Pd), tungsten (W), etc. In contrast, for conventional recording media, there is a need to separate the texture control and the thermal control, since the heat sink layer does not have an epitaxial growth relationship with the MgO and/or FePt layers.

Various embodiments may provide a simplified layer structure where a copper nitride (e.g. $Cu_3N$) layer may act as an underlayer to induce MgO (200) texture without inserting a seedlayer in between. The absence of such a seedlayer reduces the physical distance between the recording layer and the heat sink layer, together with the elimination of the interfacial thermal conductance, which improves the media cooling rate and helps to have a smaller thermal spot size. The distance between the recording layer and the heat sink layer may be reduced to be about 2.3 nm (thickness of MgO intermediate layer).

Various embodiments may enable integration of texture control and the cooling rate requirement, where a copper nitride (e.g. $Cu_3N$) underlayer may induce the growth of a (200) textured MgO layer, and a high temperature process employed for FePt based HAMR layer deposition may also decompose copper nitride to become Cu, where the Cu layer may be suitable to act as a heat sink layer due to its high thermal conductivity.

Various embodiments may allow tunability of the MgO interlayer thickness and/or the copper nitride (e.g. $Cu_3N$) underlayer thickness to allow flexibility to optimize the thermal design.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for manufacturing a recording medium for heat-assisted-magnetic-recording (HAMR), the method comprising:
    forming an underlayer on a substrate, the underlayer comprising a precursor material, wherein the precursor material comprises a copper nitride-based material or a nitride-based copper alloy;
    epitaxially depositing an interlayer on the underlayer;
    forming a recording layer over the interlayer; and
    decomposing the precursor material to a converted material having a thermal conductivity that is higher than a thermal conductivity of the recording layer.

2. The method as claimed in claim 1, wherein forming a recording layer over the interlayer comprises epitaxially depositing the recording layer on the interlayer.

3. The method as claimed in claim 1, wherein the forming a recording layer over the interlayer and the decomposing the precursor material to a converted material are carried out at least substantially simultaneously.

4. The method as claimed in claim 1, wherein the forming an underlayer is carried out at room temperature.

5. The method as claimed in claim 1, wherein the epitaxially depositing an interlayer on the underlayer is carried out at room temperature.

6. The method as claimed in claim 1, wherein the forming a recording layer over the interlayer is carried out at a temperature of between about 400° C. and about 750° C.

7. The method as claimed in claim 1, wherein the decomposing the precursor material to the converted material is carried out at a temperature of between about 100° C. and about 750° C.

8. The method as claimed in claim 1, wherein forming an underlayer comprises sputter depositing the underlayer on the substrate.

9. The method as claimed in claim 1, further comprising doping at least one of the underlayer or the interlayer.

10. The method as claimed in claim 1, further comprising forming a seedlayer, wherein forming an underlayer comprises forming the underlayer on the seedlayer.

11. The method as claimed in claim 1, wherein the converted material comprises a copper-based material.

12. The method as claimed in claim 11, wherein the interlayer comprises at least one of a magnesium oxide-based material, a titanium nitride-based material or a titanium carbide-based material.

13. The method as claimed in claim 1, wherein forming a recording layer comprises forming an $L1_0$ phase magnetic layer.

14. A method for manufacturing a recording medium for heat-assisted-magnetic-recording (HAMR), the method comprising:
    forming a heat sink layer comprising a copper-based material;
    forming an interlayer in a direct contact with the heat sink layer, wherein the interlayer comprises a magnesium oxide-based material having a (200) texture; and
    forming a recording layer over the interlayer.

15. The method as claimed in claim 14, wherein forming a heat sink layer comprises:
    forming an underlayer comprising a precursor material for forming the copper-based material, wherein the precursor material comprises a copper nitride-based material or a nitride-based copper alloy; and
    decomposing the precursor material to the copper-based material such that the underlayer forms the heat sink layer.

16. The method as claimed in claim 15, wherein forming an interlayer comprises epitaxially depositing the interlayer on the underlayer prior to converting decomposing the precursor material to the copper-based material.

17. A recording medium for heat-assisted-magnetic-recording (HAMR), the recording medium comprising:
   a recording layer;
   a heat sink layer comprising a copper-based material; and
   an interlayer arranged between the recording layer and the heat sink layer, wherein the interlayer is in a direct contact with the heat sink layer, and wherein the interlayer comprises a magnesium oxide-based material having a (200) texture.

18. The method as claimed in claim 1, wherein the interlayer comprises a magnesium oxide-based material having a (200) texture.

\* \* \* \* \*